INVENTORS
MACY M. DARLING
STANLEY T. LEWIS

BY Stevens, Davis, Miller & Mosher
ATTORNEYS

Dec. 20, 1966 S. T. LEWIS ET AL 3,292,328

SELF-SUPPORTING PANEL PARTITION WITH MAGNETIC LATCH MEANS THEREFOR

Filed June 8, 1962 5 Sheets-Sheet 2

INVENTORS
MACY M. DARLING
STANLEY T. LEWIS

BY Stevens, Davis, Miller & Mosher
ATTORNEYS

INVENTORS
MACY M. DARLING
STANLEY T. LEWIS
BY Stevens, Davis, Miller & Mosher
ATTORNEYS

INVENTORS
MACY M. DARLING
STANLEY T. LEWIS

BY Stevens, Davis, Miller & Mosher
ATTORNEYS

Dec. 20, 1966 S. T. LEWIS ETAL 3,292,328

SELF-SUPPORTING PANEL PARTITION WITH MAGNETIC LATCH MEANS THEREFOR

Filed June 8, 1962 5 Sheets-Sheet 5

INVENTORS
MACY M. DARLING
STANLEY T. LEWIS

BY Stevens, Davis, Miller & Mosher
ATTORNEYS

United States Patent Office 3,292,328
Patented Dec. 20, 1966

3,292,328
SELF-SUPPORTING PANEL PARTITION WITH MAGNETIC LATCH MEANS THEREFOR

Stanley T. Lewis, 3 Pooks Hill Road, Bethesda, Md., and Macy M. Darling, 4000 Tunlaw Road, Washington, D.C.

Filed June 8, 1962, Ser. No. 200,996
11 Claims. (Cl. 52—238)

This invention relates generally to partitions and, in particular, to demountable partitions for use within buildings.

The building industry has developed a number of demountable partitions. One class of demountable partitions, often used in circumstances where quick knock-down and relocation features are desired, consists of free standing individual panels which are connected together by bolts or the like and are largely supported by the weight of the panels at points where bearing surfaces of the panels address the floor. Another class consists of wall members which are connected to a frame work of studdings by connective means such as bolts. The latter type of partition is relatively difficult to knock down. The former type, while relatively easy to relocate, is easily moved out of position by accidental forces such as those applied by a mere casual bumping of the partition by a person using the enclosure.

An object of this invention is to provide an easily demountable partition which is also sturdy and robust.

Another object of the present invention is to provide a demountable partition which does not utilize any studding means.

A further object is to provide a demountable partition which is not easily displaced by accidentally applied forces.

Yet another object is to provide a partition which may be easily installed and quickly demounted.

Yet a further object of the invention is to provide a demountable partition which utilizes relatively few separate parts.

Still a further object of the invention is to provide a demountable partition which utilizes stress-skin panels.

These and other objects, which will be readily apparent upon reading the specification, are accomplished by providing a partition which comprises an upper support member extending downward from a ceiling, a lower support member extending upward from a floor, first latch means associated with at least one of the upper and lower support members, a plurality of self-supporting wall panel members having second latch means associated therewith, the second latch means engaging the first latch means so that the panels form a partition which is easily demountable. In another aspect, the present invention comprises a wall panel having latch means similar to the partition.

Figure 1:
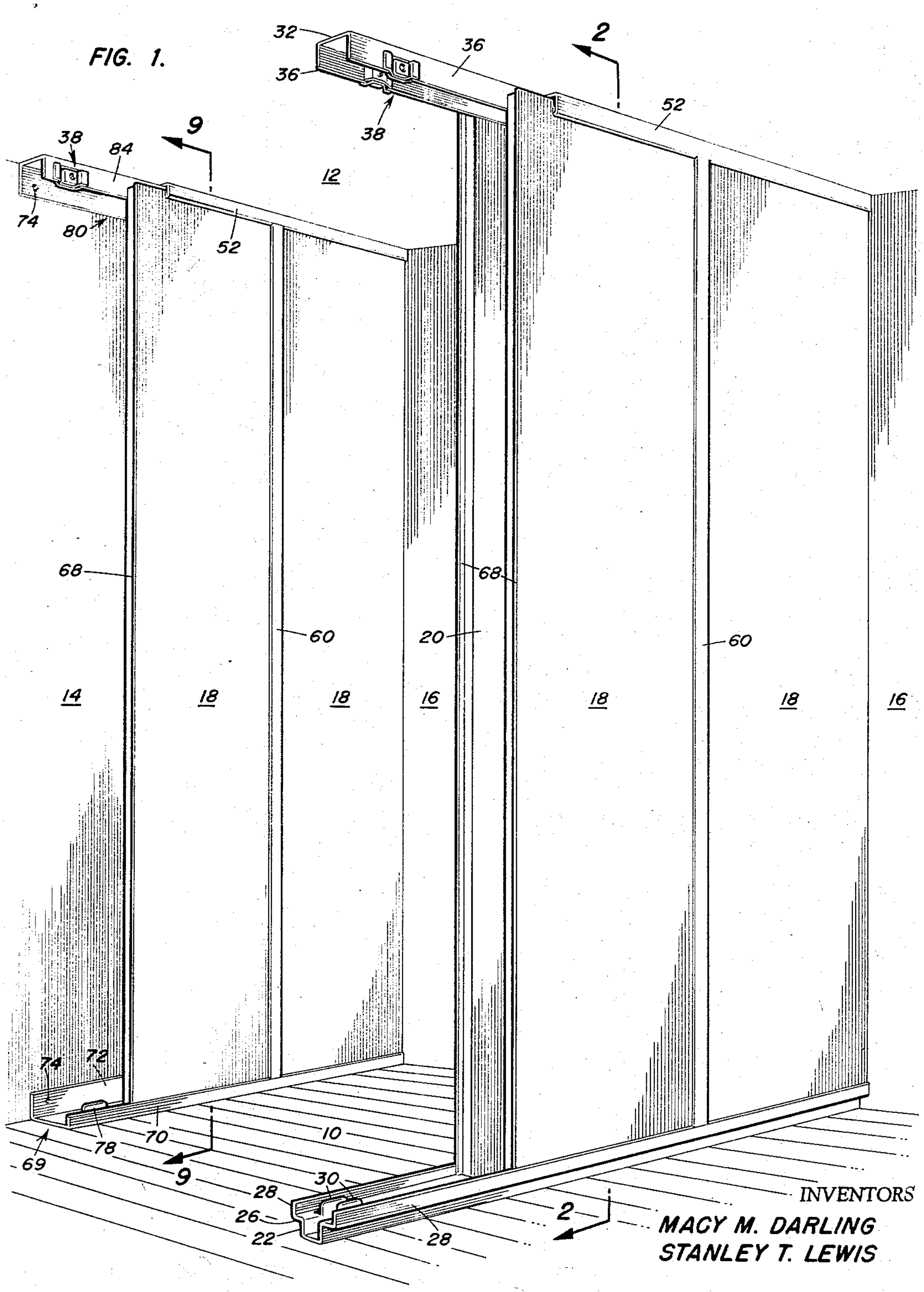
Figures 2, 3:
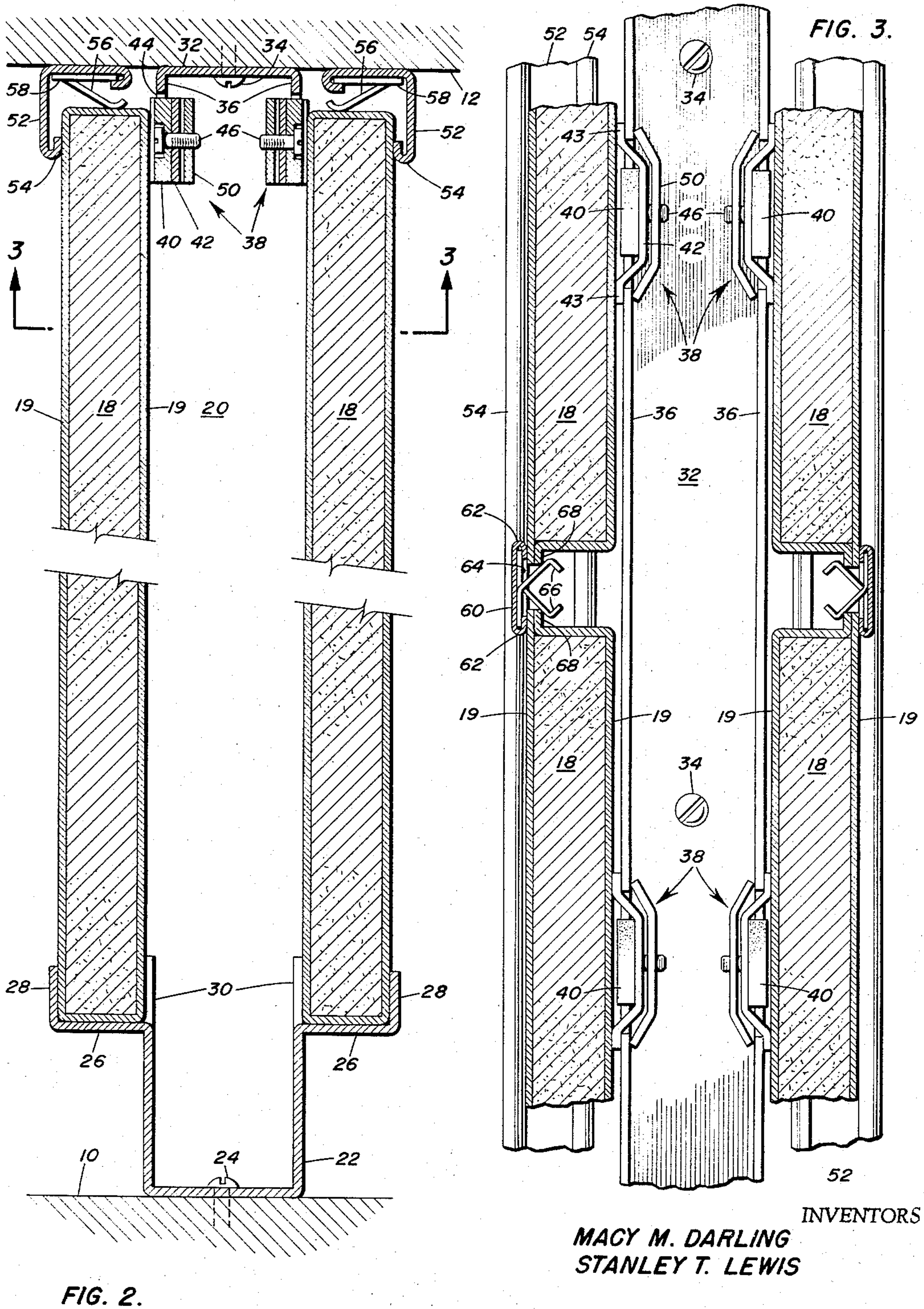
Figures 4, 5, 7, 8:
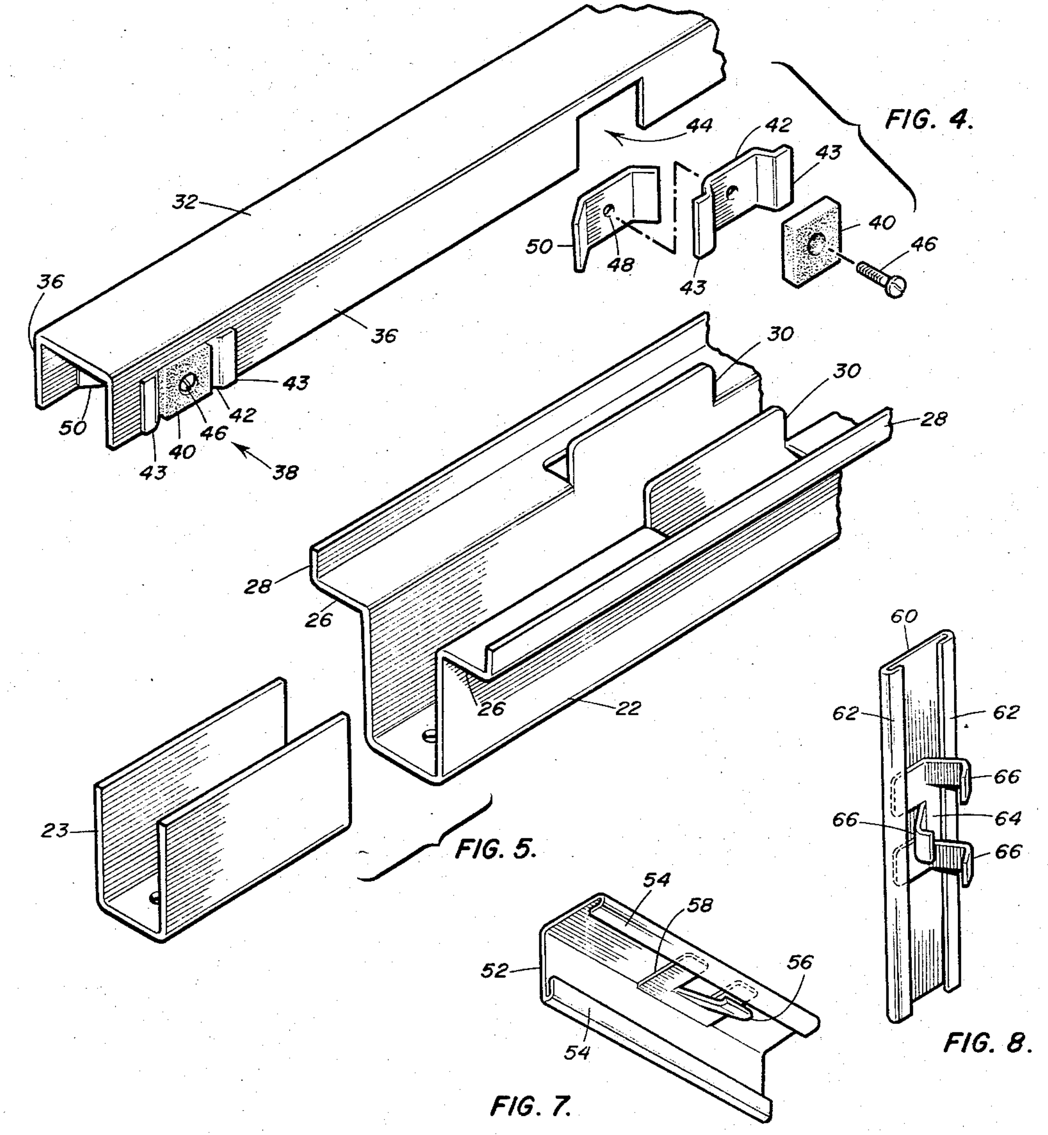
Figure 6:
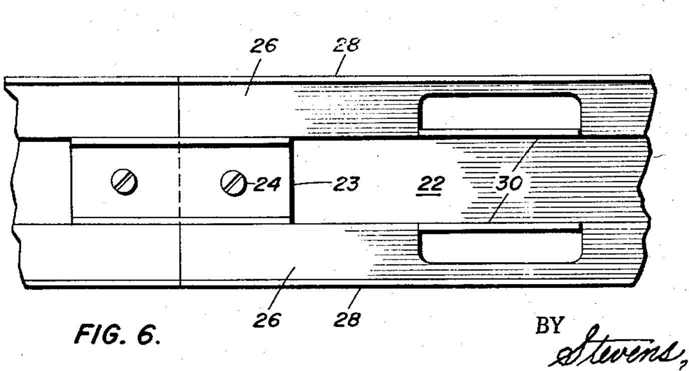
Figure 10:
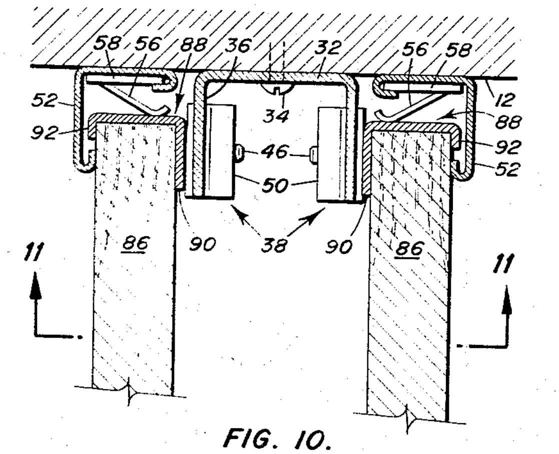
Figure 9:
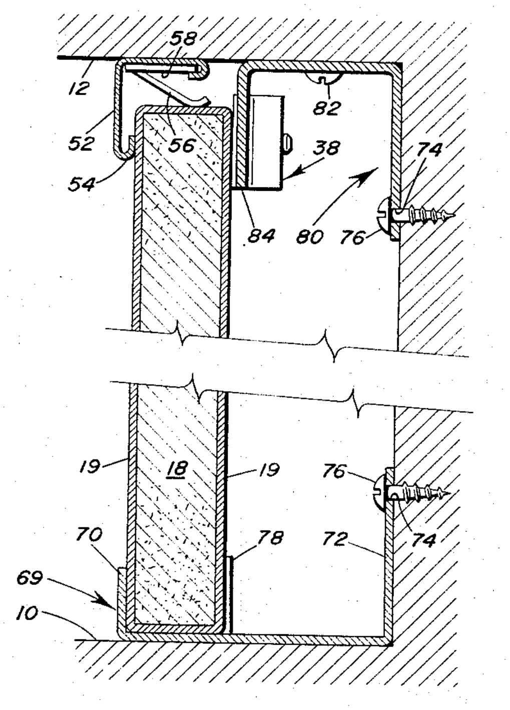
Figure 11:
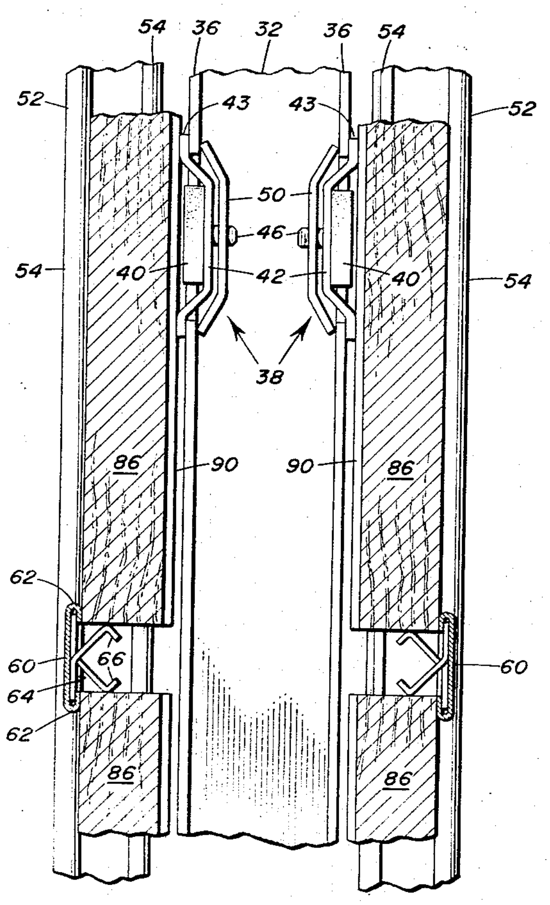
Figure 12:
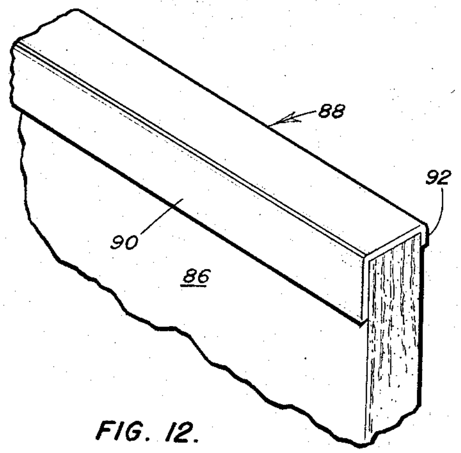
Figure 13:
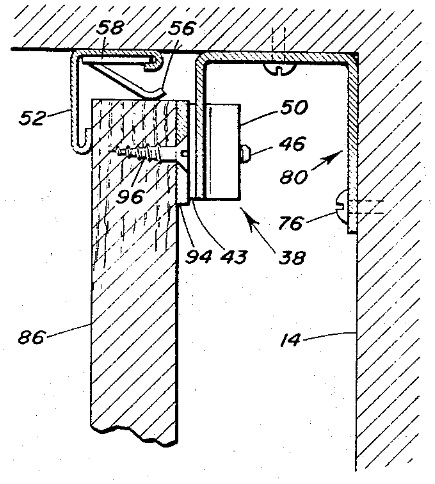
Figure 14:
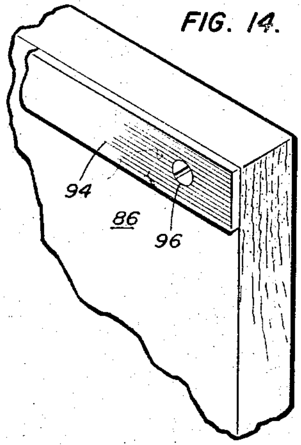
Figure 4A:
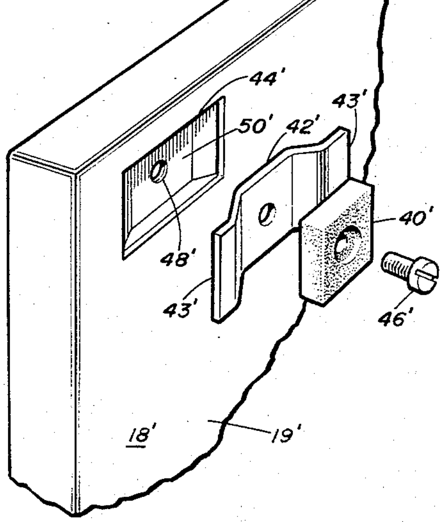
Figure 3A:
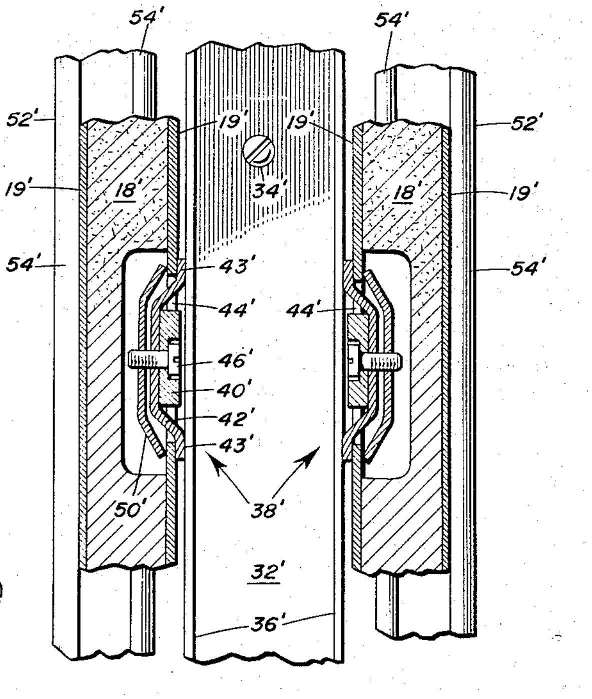

An illustrated embodiment of the present invention is shown in the accompanying drawing, in which:

FIGURE 1 is a perspective view of a pair of panelled walls at an intermediate stage of installation in the formation of a room, FIGURE 2 is a sectional view taken on the plane of line 2—2 of FIGURE 1, FIGURE 3 is a sectional view taken on the plane of the line 3—3 of FIGURE 2, FIGURE 3A is a sectional view similar to FIGURE 3, showing an alternative arrangement in which magnetic units are carried on panel members, FIGURE 4 is a perspective view of a fragment of the ceiling channel forming an abutment for the top ends of the wall panels, and showing the magnetic holder in both assembled and exploded condition, FIGURE 4A is a perspective view of a fragment of one of the panel members shown in FIGURE 3A showing the panel and a magnetic unit in exploded condition, FIGURE 5 is a perspective view of a fragment of the base channel, upon which the bottom edges of the wall panels dwell, with parts exploded, FIGURE 6 is a top plan view of the base channel fragment shown in FIGURE 5, with the parts assembled, FIGURE 7 is a perspective view of a section of trim stripping, adapted for insertion at the top of a wall panel, FIGURE 8 is a perspective view of a section of trim stripping, adapted to overlie and conceal the vertical cracks between adjacent wall panels, FIGURE 9 is a sectional view taken on the plane of the line 9—9 of FIGURE 1, FIGURE 10 is a view similar to the upper portion of FIGURE 2, showing a modified type of panelling, FIGURE 11 is a sectional view taken along the plane of the line 11—11 of FIGURE 10, FIGURE 12 is a perspective view of the upper end of one of the panels of FIGURE 10, FIGURE 13 is a view similar to the upper end of FIGURE 9, showing a further modified form of panelling, and FIGURE 14 is a perspective view of the panel shown in FIGURE 13.

Referring to the drawings by characters of reference, there is shown, in FIGURE 1, the interior of a building structure in the process of subdivision into rooms, said structure having a floor 10, a ceiling 12, and two visible walls 14, 16, of permanent construction, defining with other walls, not shown, the main room being subdivided. The wall in the right foreground of FIGURE 1 constitutes a partition, and comprises a system of double panelling, with two rows of identical panels 18, spanning the room, the two rows being separated by an air space 20. panels 18, which preferably are stress-skin panels, are covered by a metallic sheet 19, a latch means, on all faces and edges as can be seen in FIGURE 2. The lower edges of the panels 18 are supported on a channel 22, secured to the floor by suitable fastening means, such as screws 24 as can be seen in FIGURE 2, the panels dwelling on outwardly extending, horizontal flanges 26 at the top edges of the channel, and held against outward displacement by vertical rails 28 rising from the ends of flanges 26. Vertical tabs 30, struck from flanges 26, and arranged at intervals along the channel, are aligned with the sides of channel 22 (FIGURES 5 and 6), and serve to retain the panels against laterally inward movement. Splicing of channel sections 22, if necessary, is accomplished by a splint member 23 of channel section (FIGURE 5) sized to fit snugly within channel 22, and provided with screw holes registering with holes in the sections to be joined.

Spacing and retention of the top ends of the panels is accomplished by an inverted channel 32, secured to the ceiling as by screws 34 as can be seen in FIGURE 2, parallel to and directly vertically above the floor channel 22. With the bottom edges of panels 18 lodged between the rails 28 and the tabs 30 of the lower channel, their inner faces at their top edges are moved into contact with the vertical walls 36 of channel 32, where they are strongly held against removal by a series of latches, magnetic units 38 carried by the channel, and each bearing a permanent magnet 40 as can be seen in FIGURE 2.

As best seen in FIGURE 4, the magnet 40, which may be of the ceramic type, readily available commercially, is square in shape, and seated in the recess of a saddle-form holder 42, the central, recessed portion of the holder being received in a notch 44 in the wall 36 of channel 32. Both the magnet 40 and the holder 42 are centrally bored to receive a screw 46, which is receivable in the threaded bore 48 of a clamping, leaf-spring nut 50, which engages the inner face of wall 36 and holds the unit firmly in place. Screw 46 may be of the type which will cut its own threads in bore 48 of the nut. The outer face of magnet 40 is slightly within the outer faces of end flanges 43 of holder 42, thus avoiding direct contact of the panel with the magnet and, therefore, is spaced from the outer surfaces of panels 18. When the panels are brought to a position near the vertical, their outer, metal jackets 19 come within the influence of the magnetic fields of units 38, and the panels snap into place, in a union which is proof against accidental dislodgment. This is especially true since the only possible direction of accidental forces is inward, toward the magnets. However, deliberate removal, when desired, is easily effected, since the space between the panel and the ceiling channel affords a purchase for a prying tool. Also, after removal of one panel, the space between the panels is accessible from the side edges of the panels, for application of removal forces.

The space between the top of the panels and the ceiling is covered by a steel, trim strip 52 of right-angle cross-section (FIGURE 7), with reversely, folded end edge portions 54, the strip being mounted on the outer edge of the upper ends of panels 18, with one leg in the top opening, and the other covering the opening (FIGURE 2). Retention of the trim strip in place is accomplished by a series of spring fingers 56, struck from rectangular pieces 58 of suitable spring-steel material, spot welded or otherwise secured to the inner surface of the horizontal leg of trim strip 52. The finger 56 bears on the top end of panel 18 and urges the horizontal leg of the trim strip against the ceiling, the trim strip being thus held firmly in place, but yielding to moderate forces when removal is desired.

The vertical space, or crack, between adjacent panels is covered by a flat trim strip 60 (FIGURE 8), having reversely folded side edge portions 62. On the inner surface of this trim strip is a series of spaced, frictional retaining elements comprising flat sections 64 of spring-steel stock, secured as by spot welding to the strip 60, and having three, outwardly struck fingers 66, one on one side of the section 64, at its middle, and two at the other side, at its ends. All fingers have inwardly bent, end tongues for easy insertion into, and removal from, the cracks between the panels. As seen in FIGURES 1, 2 and 3, the ends of the metallic covering 19 of the panels are joined in a fold which provides an outwardly extending flange 68 along the vertical edges and at the outer surface of the panel. In pressing the vertical trim strip into place, the fingers 66 are bent inwardly in passing an adjacent pair of the flanges 68, and spread outward into locking position after passing the flanges. As in the case of the ceiling corner trim, these strips are secure against removal by accidental forces, but are easily removable by deliberate effort.

For an end wall, as distinguished from a partition, only one row of panels is needed, and for this construction, the ceiling and floor channels are modified in certain particulars. (FIGURES 9 and 13, and the background panels in FIGURE 1.) The floor channel 69, in this case, simply has two vertical walls, a low, outer wall 70, which retains the panels 18 and also serves as trim, and a higher, rear wall 72 having openings 74 for screws 76 as shown in FIGURE 9, or other fasteners, which secure it to a wall, such as wall 14. The bottom of the panel is thus nearer to the floor than the partition panels. To provide the air space behind the panels, channels 69 are considerably wider than the panel thickness, and the panels are held in spaced relation to the building wall by means of vertical tabs 78, struck from the bottom of channel 69, and so located that the panels are snugly held against movement toward or away from the wall.

The ceiling channels 80 for the single-layer wall are generally similar to the floor channels therefor, and inverted so that the base of the channel touches the ceiling. In this case, also, there are fastening screws 82, as shown in FIGURE 9, which pass through the bottom of the channel, and into the ceiling. Channel 80 is narrower than channel 69, and the panels abut against the outer surfaces of its outer wall 84, which is aligned with the tabs 78 in the base channel, and which carries a series of magnetic holders 38 similar to those in the partition wall assembly. The ceiling corner trim strip 52 is also the same as in the partition wall, as are the vertical, trim strips 60.

In FIGURES 10, 11 and 12 is shown the upper portion of a partition assembly of the general type shown in FIGURE 2, but with modified panels. In this case the panels 86 are of self-supporting material, such as plastic, aluminum, fiber board, or the like, and the sheet metal envelope 19 is omitted, and for accomplishing the magnetic locking function, metallic channels 88 are mounted on the top edges of the panels. These channels have a vertical wall 90 extending downward sufficiently to come within the fields of the magnetic units 38, and a shorter, outer wall 92, just sufficient to hold the channel on the panel. The channel 88 may be press-fitted into place, or may have suitable fasteners.

In FIGURES 13 and 14, a panel 86 is shown as having only a flat strip 94, of metal, corresponding to the wall 90 of channel 88, secured by screws 96 to the panel, and adapted to cooperate with magnetic units 38, as shown in the single-layer wall assembly of FIGURE 13.

The magnetic units 38 may be mounted in the associated channel at predetermined intervals but may also be placed at more desirable locations during the erection of a wall by the simple expedient of cutting new notches, to replace or augment notches 44, for the reception of the magnetic units 38.

An alternative arrangement in which the magnetic units are carried on the panels and the inverted channel member is made of magnetizable material is illustrated in FIGURES 3A and 4A in which parts are provided with primed reference numerals which correspond to similar unprimed numerals shown in FIGURES 3 and 4. The magnetic units 38′ are carried in notches 44′ provided in panels 18′ which have metal jackets 19′ thereon. Leaf-spring nuts 50′ are placed within notches 44′ behind extensions of the metal jacket 19′ on each panel. Magnets 40′ are seated in recesses provided in saddle-form holders 42′. The magnets 40′ and saddle-form holders 42′ are centrally bored to receive screws 46′ which are receivable in the threaded bores 48′ provided in leaf-spring nuts 50′. The outer surface of magnets 40′ are slightly within the outer faces of end flanges 43′ of holders 42′. A channel form member 32′ having side walls 36′ is held in a ceiling by screws 34′. When the panels 18′ are in position the magnetic units 38′ address the side walls 36′ of channel form member 32′ and the panels held in such position. The panels 18′ may be held in floor engaging members in the manner shown in FIGURE 1. Trim strips 52′ having folded end edge portions 54′ are provided between the ceiling and the top of panels 18′.

It will thus be seen that there has been provided a system of components for wall construction, which lends itself readily to rapid and accurate mounting in any desired room layout, by unskilled labor, and equally rapid disassemly, for storage, transport or rearrangement, without detriment either to the fixed building or to the wall components. In addition to this, the system is attended with economies, as to cost, labor and materials among other things, being simple in form and easy of manipulation, with a very minimum of destructive fastening devices, and made up of inexpensive, easily manufactured, and universally available materials. Since the assembly practically "falls into place," the virtues of the system may be succinctly characterized as comprising an altogether satisfactory degree of security of attachment accomplished in the almost complete absence of fastening means, the few anchoring screws being minimal in amount, and the only other components remotely resembling fastening means being the magnetic holders (at a region of light loading) and the snap-on trim strips, neither of which components is comparable to one-use fasteners such as screws, nails, and the like, which are destructive of material, and not compatible with repeated use and rearrangement of wall components.

Generally speaking, while an illustrated embodiment has been shown and described, together with some modifications of components, other modifications will become apparent, in the light of this disclosure, and the invention should not, therefore, be deemed as limited, except insofar as shall appear from the spirit and scope of the appended claims. For example, the magnet means may be carried on the panels and the ceiling members be made a magnetizable material. The panels may, in some instances, be of non-metallic construction and may include an insulating filler. In some installations, the panels may be provided with a tongue-in-groove arrangement or the like so that the vertical small sides of the panels will fit together. In this instance, vertical trim strips are unnecessary.

We claim:

1. A demountable partition for the interior of buildings comprising, a floor-engaging support member, a ceiling-engaging support member, said ceiling-engaging support member including first and second latch means in parallel spaced apart relation, at least one first self-supporting panel having a third latch means associated therewith, the at least one first panel addressing the two support members so that the first latch means engages the third latch means, and at least one second self-supporting panel having a fourth latch means associated therewith, the at least one second self-supporting panel addressing the two support members so that the second latch means engages the fourth latch means whereby the first and second panels are firmly held in opposed relationship to one another forming a partition.

2. A demountable partition for the interior of buildings comprising, a floor-engaging support member, a ceiling-engaging support member, said ceiling-engaging support member including at least one first and at least one second magnet in parallel spaced apart relation, at least one first self-supporting panel made at least in part of magnetizable material, the at least one first panel addressing the two support members so that the at least one first magnet engages the magnetizable material thereon, and at least one second self-supporting panel made at least in part of magnetizable material, the at least one second self-supporting panel addressing the two support members so that the at least one second magnet engages the magnetizable material thereon whereby the first and second panels, are firmly held in opposed relationship to one another forming a partition.

3. A demountable partition for the interior of buildings comprising, a floor-engaging support member, a ceiling-engaging support member, said ceiling-engaging support member including a first surface and a second surface made of magnetizable material, the surfaces extending downward in parallel spaced apart relation, at least one first self-supporting panel having at least one first magnet associated therewith, the at least one first panel addressing the two support members so that the at least one first magnet engages the first surface, and at least one second self-supporting panel having at least one second magnet associated therewith, the at least one second self-supporting panel addressing the two support members so that the at least one second magnet engages the second surface whereby the first and second panels are firmly held in opposed relationship to one another forming a partition.

4. A demountable partition according to claim 1, wherein the self-supporting panels are stress-skin panels.

5. A demountable partition according to claim 2, wherein the self-supporting panels are stress-skin panels.

6. A demountable partition according to claim 3, wherein the self-supporting panels are stress-skin panels.

7. A demountable partition for the interior of buildings, comprising a lower, floor-engaging support of generally channel-form section, open upwardly and having horizontal flanges extending outwardly from its respective, upper edges, said flanges having upwardly extending, vertical walls at their outer ends, and having upwardly extending, vertical tabs at spaced intervals along their lengths said tabs being struck from the material of said flanges and coplanar with the side walls of said channels, an upper support of channel form, adapted to be secured to a ceiling in downwardly open position, parallel to and vertically above said lower support, a series of magnetic units arranged in spaced relation along both side walls of said upper support, a first plurality of panels having at least a portion of the surface thereof made of magnetically responsive material, and of a thickness adapted to fit snugly between the vertical wall and its associated tab on one of said flanges of said lower support, said magnetically responsive material being positioned within the first of said series of magnetic units on one of the two side walls, a second plurality of panels having at least a portion of the surface thereof made of magnetically responsive material, and of a thickness adapted to fit snugly between the vertical wall and its associated tab on the other of said flanges of said lower support, the last said magnetically responsive material being positioned within the field of said series of magnetic units on the other of the two side walls, whereby the first and second pluralities of panels are firmly held in opposed relationship to one another forming a partition.

8. A demountable wall assembly for the interior of buildings, comprising a lower, floor-engaging support of generally channel-form section, open upwardly and having horizontal flanges extending outwardly from its respective, upper edges, said flanges having upwardly extending, vertical walls at their outer ends, and upwardly extending, vertical tags at spaced intervals along their lengths, said tabs being struck from the material of said flanges and coplanar with the side walls of said channel, an upper support of channel form, adapted to be secured to a ceiling, in downwardly open position, parallel to and vertically above said lower support, said upper support being made of magnetically responsive material, a first plurality of wall panels having a first series of magnetic units arranged on a portion of a side surface thereof, near the top, said first plurality of panels being of a thickness adapted to fit snugly between the vertical wall and its associated tab on one of said flanges of said lower support, said magnetically responsive material being within the field of said first series of magnetic units, a second plurality of wall panels having a second series of magnetic units arranged on a portion of a side surface thereof, near the top, said second plurality of panels being of a thickness adapted to fit snugly between the vertical wall and its associated tab on the other of said flanges of said lower support, said magnetically responsive material being within the field of said second series of magnetic units, whereby the first and second pluralities of panels are firmly held in opposed relationship to one another forming a partition.

9. A demountable wall assembly for the interior of a building comprising a lower, floor-engaging support of generally channel-form section, open upwardly and having horizontal flanges extending outwardly from its respective, upper edges, said flanges having upwardly extending, vertical walls at their outer ends, and having upwardly extending, vertical tabs at spaced intervals along their lengths, said tabs being struck from the material of said flanges and coplanar with the side walls of said channel, an upper support of channel form, adapted to be secured to a ceiling, in downwardly open position, parallel to and vertically above said lower support, a series of magnetic units arranged in spaced relation along both side walls of said upper support; a first plurality of wall panels having at least a part thereof composed of magnetically responsive material, and of a thickness adapted to fit snugly between the vertical wall and its associated tab on one of said flanges of said lower support, a first trim strip of angle section, with reversely folded outer edges adapted for reception on an edge of the upper ends of said first plurality of panels, and having a series of spring fingers adapted to apply tension to the upper ends of said first plurality of panels while urging said first trim strip against a ceiling, and a series of second trim strips, for vertical spaces between said first plurality of panels, of flat stock, with reversely folded longitudinal edges, and having a series of spring fingers, bowed in opposite directions, said plurality of panels adapted to receive said latter spring fingers and hold them against withdrawal, the portion of the first plurality of wall panels which is made of magnetically responsive material being within the magnetic field of those magnetic units arranged on one of the side walls; a second plurality of wall panels having at least a part thereof composed of magnetically responsive material, and of a thickness adapted to fit snugly between the vertical wall and its associated tab on the other of said flanges of said lower support, a third trim strip of angle section, with reversely folded outer edges adapted for reception on an edge of the upper ends of said second plurality of panels, and having a series of spring fingers adapted to apply tension to the upper ends of said second plurality of panels while urging said third trim strip against a ceiling, and a series of fourth trim strips, for vertical spaces between said second plurality of panels, of flat stock, with reversely folded, longitudinal edges, and having a series of spring fingers, bowed in opposite directions, said plurality of panels adapted to receive said latter spring fingers and hold them against withdrawal, the portion of the second plurality of wall panels which is made of magnetically responsive material being within the magnetic field of those magnetic units arranged on the other of the side walls.

10. A demountable wall assembly for the interior of buildings, comprising a lower, floor-engaging support of generally channel-form section, open upwardly and having horizontal flanges extending outwardly from its respective, upper edges, said flanges having upwardly extending vertical walls at their outer ends, and having upwardly extending, vertical tabs at spaced intervals along their lengths, and upper support of channel form, adapted to be secured to a ceiling, in downwardly open position, parallel to and vertically above said lower support, a first series of latch units arranged in spaced relation along both walls of said upper support, a first plurality of wall panels having a second series of latch units on one face, near the top, said first plurality of panels being of a thickness adapted to fit snugly between the vertical wall and its associated tab on one of said flanges of said lower support, the first and second latch units being arranged in engaging relationship, a second plurality of wall panels having a third series of latch units on one face, near the top, said second plurality of panels being of a thickness adapted to fit snugly between the vertical wall and its associated tab on the other of said flanges of said lower support, the first and third latch units being arranged in engaging relationship, whereby the pluralities of panels are firmly held in opposed relationship to one another forming a partition.

11. A demountable wall assembly for the interior of buildings, comprising a lower, floor-engaging support of generally channel-form section, open upwardly and having horizontal flanges extending outwardly from its respective upper edges, said flanges having upwardly extending, vertical walls at their outer ends, and having upwardly extending, vertical tabs at spaced intervals along their lengths, an upper support of channel form, adapted to be secured to a ceiling, in downwardly open position, parallel to and vertically above said lower support, a series of magnetic units arranged in spaced relation along both side walls of said upper support, and a pair of wall panels each having a strip of magnetically responsive material on one face, near its top, and of a thickness adapted to fit snugly between the vertical wall and its associated tab on each of said flanges of said lower support, the magnetically responsive material on one of the panels engaging the series of magnetic units which are on one side wall of the upper support, the magnetically responsive material on the other of the panels engaging the series of magnetic units on the other side wall of the upper support, whereby the panels are firmly held in opposed relation to one another forming a partition.

References Cited by the Examiner

UNITED STATES PATENTS

| | | | |
|---|---|---|---|
| 1,708,351 | 4/1929 | Auld | 52—222 |
| 2,000,243 | 5/1935 | Manske | 52—220 |
| 2,202,861 | 6/1940 | Mills | 52—282 |

FOREIGN PATENTS

| | | |
|---|---|---|
| 717,333 | 10/1954 | Great Britain. |

FRANK L. ABBOTT, *Primary Examiner.*

RICHARD W. COOKE, Jr., *Examiner.*

R. S. VERMUT, *Assistant Examiner.*